Figure 1:
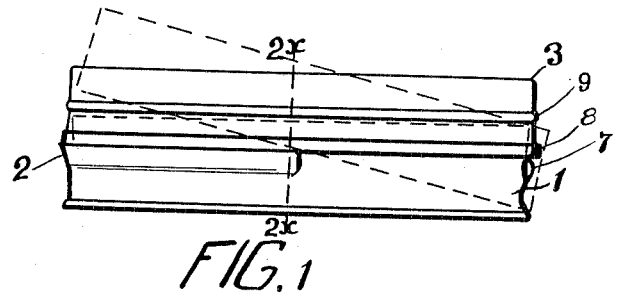

T. C. & O. G. METZGER.
BOX AND COVER THEREFOR.
APPLICATION FILED MAR. 17, 1913.

1,115,081.

Patented Oct. 27, 1914.

Witnesses
Eric Ischinger.
Alice M. Johannes.

Inventors
Tillo C. Metzger
Oscar G. Metzger
By Frank Keifer
Attorney ptomos
UNITED STATES PATENT OFFICE.

TILLO C. METZGER AND OSCAR G. METZGER, OF ROCHESTER, NEW YORK.

BOX AND COVER THEREFOR.

1,115,081.      Specification of Letters Patent.      Patented Oct. 27, 1914.

Application filed March 17, 1913. Serial No. 755,002.

*To all whom it may concern:*

Be it known that we, TILLO C. METZGER and OSCAR G. METZGER, citizens of the United States, residing at Rochester, in the county of Monroe and State of New York, have invented certain new and useful Improvements in Boxes and Covers Therefor, of which the following is a specification.

The object of this invention is to provide a box or can and cover therefor which can be readily opened and closed. These and other objects of my invention will be fully illustrated in the drawings and pointed out in the claims at the end thereof.

Figure 2:
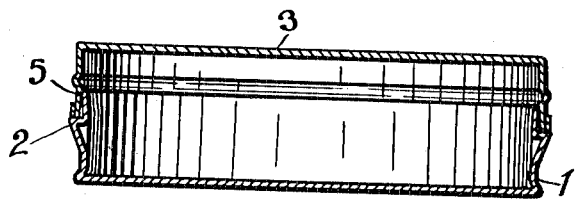
Figures 3, 4:
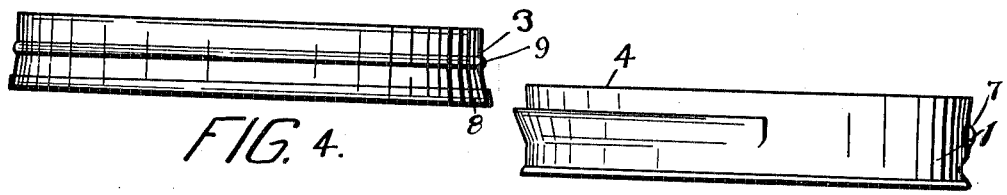
Figure 5:
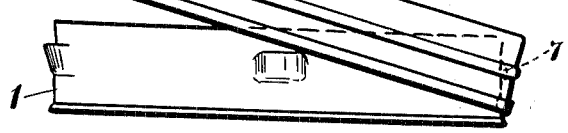

In the accompanying drawings, Figure 1 illustrates the box with our improved cover thereon. Fig. 2 is a vertical section on the line 2<sup>x</sup>—2<sup>x</sup> of Fig. 1. Fig. 3 illustrates the box without the cover. Fig. 4 illustrates the cover without the box. Fig. 5 shows a modification of the box.

In the drawings reference numeral 1 indicates the can or box. This box has a shoulder 2 near the top extending part way around the circumference thereof.

3 indicates the cover, which cover is preferably formed out of a single sheet of metal. The cover is preferably circular in shape, corresponding to the shape of the box, although if desired, both the cover and box can be rectangular in shape.

The side or flange or both the body and the cover of the box should be flared outwardly at the edge for the purpose that will now be described.

When the top is placed upon the body of the box, the outwardly flared edge thereof makes it slip easily to place and it also tends to compress within it the outwardly flared side of the body of the box forming a tight joint between the body of the box and the top of the box, which joint is limited to substantially a single line of contact, the joint being tighter and being more easily opened and closed on this account. When the box is closed, the edge of the flange and the cover will rest upon the shoulder 2 as far as the shoulder extends and all of the edge 4 of the body of the box will be compressed within the flange of the cover as is illustrated at 5 in Fig. 2.

In opening the box, pressure is applied at the edge of the cover above that portion of the box around which no shoulder extends and at a point substantially in line with the center of the box between the ends of the shoulder 3. This will cause the cover to rock on the ends of the shoulder 3, as shown in dotted lines in Fig. 1, until one of the narrow edges of the cover clears the top of the box, after which the cover can be readily removed. The opening of the box is made easier by flaring outwardly the flanges of the box and cover in the manner described above. In this way the point of contact is very small around the circumference of the flanges of the cover and box, as shown in Fig. 2, so that in opening the box the cover will come off very easily after it once has passed the point of contact. By reversing the operation, the cover can be easily returned to place.

In order to improve the stability of the cover of the box during shipment, a projection 7 may be added to the bottom of the box in the middle of the open space between the ends of the flange 2 as shown in Figs. 1, 3 and 5. This projection will be simply a slight bulge in the metal having a somewhat less projection than the flange and having its top rounded so that the cover can with sufficient pressure, slip over it so it is rocked down to the position shown in dotted lines in Fig. 1. The presence of this bulge in the metal will not interfere with the opening of the box but will somewhat increase the force necessary to rock the cover. If desired the bottom of the box can be slightly concave below this bulge so as to give the cover ample room to swing in although if the cover itself is sufficiently flared outwardly, this may be unnecessary.

It has been found in practice that if the flange 2 is made rather narrow in its horizontal dimension, there is a tendency for the edge of the cover to spring over the side of the flange 2 instead of rocking over the ends of it. To overcome this, it is only necessary to stiffen the cover slightly in either or both of the following ways: The lower edge of the flange of the cover may be turned out and back on itself thus doubling the thickness of the metal as is illustrated at 8 or the cover may be stiffened by putting an annular bead therein as indicated at 9. Either or both of these expediences will hold the cover firmly in line with the ends of the flange 2 so that it will rock thereon causing the left hand side of the cover as shown in Fig. 1, to rise clear of the top of the bottom of the box.

This box may be used for any purpose, such as blacking boxes, grip soap boxes, powder boxes, etc., while the construction may also be used in connection with glass jars.

We claim:

1. A box consisting of a top portion and a body portion, the body portion having protuberances on the vertical side thereof a substantial distance below the top edge, said protuberances being arranged at points approximately diametrically opposite to each other, the space between said protuberances on one side of the diametrical line connecting them being free from protuberances.

2. A box consisting of a top portion and a body portion, the body portion having protuberances on the vertical side thereof a substantial distance below the top edge, said protuberances being arranged at points approximately diametrically opposite to each other, the space between said protuberances on one side of the diametrical line connecting them being free from protuberances, the top portion being adapted to maintain a horizontal position on said protuberances or to rock to an inclined or tilted position thereon.

3. A box containing a top portion and a body portion, the body portion having a semicircular flange on the vertical side thereof a substantial distance below the top edge, the space between the ends of said flange being a smooth half cylinder, the lower edge of the top portion being seated on said flange normally parallel to the bottom portion and being adapted to rock on the ends of said flange and in the space between the ends of said flange to a position inclined to said bottom.

4. A box consisting of a top portion and a body portion, the body portion having protuberances on the vertical side thereof at points approximately diametrically opposite to each other, said body portion having, also, a short isolated projection in the space between said proturberances on one side of the diametrical line connecting the pro-. tuberances.

5. A box consisting of a top portion and a body portion, the body portion having protuberances on the vertical side thereof at points approximately diametrically opposite to each other, the space between said protuberances on one side of the diametrical line connecting them being interrupted by a short isolated projection upon which a portion of the cover seats and over which the cover snaps in opening.

6. A box consisting of a top portion and a body portion, the body portion having protuberances on the vertical sides thereof below the top edge and at points approximately diametrically opposite to each other, said protuberances forming fulcrums against which the edge of the cover portion rocks from a horizontal to an inclined or tilted position.

7. A box consisting of a top portion and a body portion, the body portion having protuberances on the vertical side thereof below the top edge distributed substantially half way around the box, said protuberances supporting the cover and preventing the cover from rocking downwardly on their side of the box, leaving the cover free to rock downwardly on the other side of the box.

In testimony whereof we affix our signatures in presence of two witnesses.

TILLO C. METZGER.
OSCAR G. METZGER.

Witnesses:
LENA M. ASH,
ALICE M. JOHANNS.